June 3, 1958   P. H. TAYLOR ET AL   2,837,329
LIQUID SPRING
Filed April 14, 1955

INVENTORS.
Paul H. Taylor and Robert F. Zumwalt
BY
Attorney.

United States Patent Office 2,837,329
Patented June 3, 1958

2,837,329

LIQUID SPRING

Paul H. Taylor, Grand Island, and Robert F. Zumwalt, Tonawanda, N. Y., assignors to Wales-Strippit Corporation, North Tonawanda, N. Y., a corporation of New York Application April 14, 1955, Serial No. 501,272

12 Claims. (Cl. 267—64)

The present invention relates to liquid springs.

Liquid springs take advantage of the limited compressibility of liquids, such as silicone base liquids which may be compressed as much as 20% by volume. As heretofore made, such a spring has comprised a chamber completely filled with a liquid and having a single piston reciprocable therein. When a force is applied to the piston driving it inwardly into the chamber, the liquid contained therein is compressed providing a high pressure cushioning and recoil device for the element with which the spring is used.

Spring devices of this type are customarily preloaded so that compression of the liquid will begin with the initial movement of the piston. Such devices produce an extremely high spring rate because of the tremendous internal pressures produced. This internal pressure may range from 20,000 to 50,000 p. s. i.

However, there are many situations in which liquid springs of conventional design cannot be used because of the great initial forces, but in which liquid springs could be employed if such devices were capable of producing dual spring rates, that is, a spring rate which is relatively small initially but increases sharply at a specified point. For instance, it is common to provide trucks with over-load springs in addition to the ordinary springs. The overload springs are mounted so that they are not put into operation until the weight on the ordinary springs compresses the ordinary springs beyond a certain point. Then, too, there are instances where it is undesirable that the maximum absorption rate of a spring be developed immediately upon application of a force thereto because this would produce too great a shock, and where it is desirable that the force applied to the spring be absorbed initially at a low rate and until the force has been absorbed to a predetermined extent, and then the full spring rate will be applied to the force. For example, in the case of a machine gun mounted in an airplane it is not desirable that the full thrust of the recoil of the gun be transmitted immediately and directly to the airplane, but that this force be cushioned softly initially by a soft spring, and then only after initial cushioning be transmitted to a spring capable of absorbing the total thrust.

One object of this invention is to provide a liquid spring which will respond with an initial low spring rate to a load.

Another object of this invention is to provide a liquid spring which will respond with an initial low spring rate and then provide a much higher spring rate when subjected to a relatively heavy load.

Another object of this invention is to provide a liquid spring which will operate equally as well under light loads or heavy loads.

Another object of this invention is to provide a liquid spring which will cushion normal loads, as in a motor vehicle, and is further capable of cushioning an overload.

A further object of this invention is to provide a liquid spring which is adapted to absorb the recoil of a machine gun, or similar rapid-firing device, and to cushion the device without transmitting excessive load to the airplane or other apparatus upon which the gun is mounted.

Another object of the invention is to provide a liquid spring of the character described in which the point at which the higher spring rate becomes effective may be adjusted.

Other objects of the invention will appear hereinafter from the following description and from the recital of the appended claims.

Figure 1:
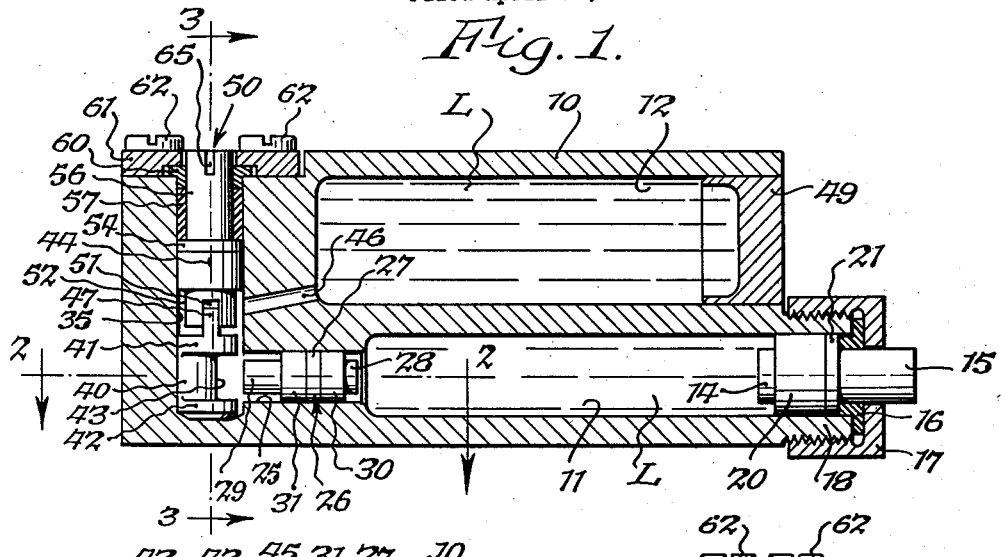
Fig. 1 is an axial section of a liquid spring constructed according to one embodiment of this invention.

While liquid springs of conventional design have a single compression chamber and a single reciprocable piston, the improved liquid spring of the present invention has two major compression chambers, and two pistons.

The spring illustrated comprises a vessel or container 10 which is generally oval-shaped in cross-section, and which has two parallel chambers 11 and 12 formed therein. The chamber 11 constitutes a cylinder in which a piston 14 is reciprocable. Piston 14 has an integral rod or shank portion 15 which projects outwardly of the bore or cylinder 11 through a conventional seal 16 and a retaining nut 17. Nut 17 is threaded onto a protruding neck portion 18 of the vessel or container 11. Piston 14 carries a conventional sealing member 20 which may be made of a resilient plastic material, such as nylon, or which may be made as described in the U. S. patent application of Charles Lee Rovoldt, Serial No. 298,094, filed July 10, 1952, now Patent No. 2,708,573. Seal 20 bears tightly against the bore of cylinder 11 and serves to guide the piston in its reciprocating movement. The seal 20 seats against and is held in place by a shoulder or flange 21 on the piston.

The cylinder 11 communicates at its inner end with an axially-aligned cylinder or bore 25 which is smaller diameter. Reciprocable in cylinder or bore 25 is a floating piston or valve 26 which has a body portion 27 and shank or rod portions 28 and 29 projecting from opposite ends of said body portion. A pair of seals 30 and 31 are mounted on said body portion and seated against opposite ends thereof. These seals may be similar in structure to seal 20. They provide a liquid tight connection between the piston or valve 26 and cylinder 25.

The cylinder 25 communicates with a bore 35 which is perpendicular to it and to cylinder 11. Positioned in the lower end of bore 35 to cooperate with piston or valve 26 is a rotatably adjustable stop 40.

Stop 40 is generally cylindrical in shape. It has flanges 41 and 42 adjacent opposite ends and a portion 43 between the two flanges which is eccentric of the axis 44 of bore 35. Portion 43 serves to limit axial movement of piston 26 to the left in cylinder 25 as viewed in Fig. 1.

Figure 2:
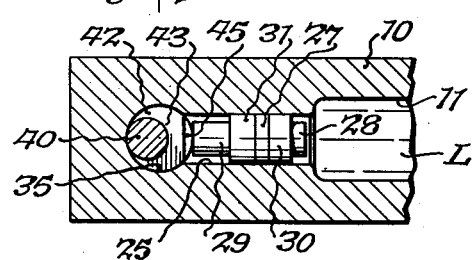
Fig. 2 is a section taken on line 2—2 of Fig. 1 looking in the direction of the arrows.
Figure 3:
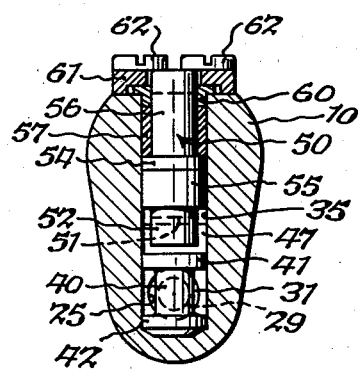
Fig. 3 is a section taken on line 3—3 of Fig. 1 looking in the direction of the arrows.

The flanges 41 and 42 are slabbed off, as denoted at 45 in Fig. 2, to provide a passageway in bore 35 for flow of liquid between cylinder 25 and cylinder 12. Bore 35 is connected with cylinder 12 by a duct 46. The outer or open end of cylinder 12 is closed by a plug 49 which is welded or brazed in place.

Cylinders 11 and 25, bore 35, duct 46 and cylinder 12 are completely filled with a compressible liquid L, such as a silicone base liquid. The liquid L is confined within the spring and is prevented from escaping by the various seals previously mentioned and by plug 49.

Stop 40 is adjusted to adjust the limit of leftward movement (Fig. 1) of piston or valve 26 by rotation of an adjusting member 50. Stop 40 has an upwardly projecting lug 47 which engages in a slot 51 in the lower, furcated end 52 of the adjusting member 50.

Adjusting member 50 has a body portion 54 which carries a seal 55 that has tight sealing engagement with bore 35. Adjusting member 50 has a reduced diameter shank portion 56 above body portion 54. On this shank portion is mounted a sealing sleeve 57 that also has a tight sealing fit in bore 35. Seals 55 and 57 may be similar in construction to seals 20, 30 and 31. Shank portion 56 extends outwardly through a seal 60, which may be similar to seal 16, and which is held in position by a clamping disc 61 and screws 62. The latter thread into vessel or container 10. The vessel or container is suitably recessed to receive clamping disc 61.

The outer end of the shaft or shank portion 56 of adjusting member 50 has a slot or kerf 65 in it which is adapted to receive a screwdriver or similar tool so that the adjusting member can be rotated to thereby rotate eccentric stop 40. Suitable graduations may be provided on disc 61 so that the exact position of the stop can readily be adjusted. For convenience kerf 65 may be aligned with kerf 51.

Figure 4:
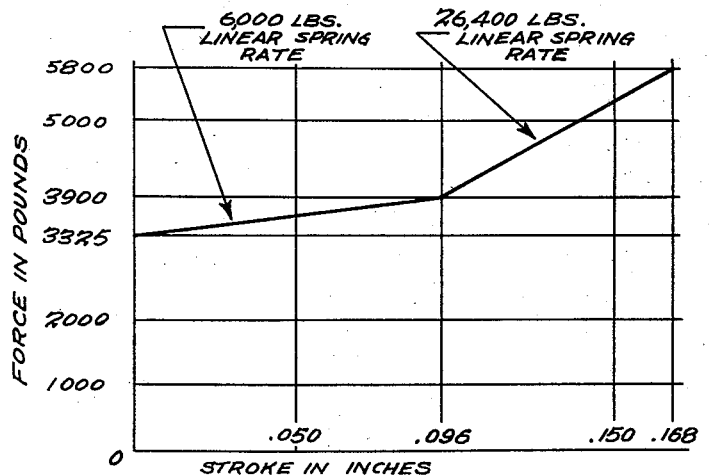
Fig. 4 is a graph illustrating the linear spring rates of the device.

In operation, the liquid spring described is interposed between two parts, one stationary and the other movable relative thereto, with the movable element bearing against piston rod 15. When a force is applied to rod 15, for example by the recoil of a machine gun, piston 14 is driven inwardly into cylinder 11. The force is transmitted through the liquid L to the floating piston or valve 26 causing it to move axially toward stop 40. The liquid in bore 35 is forced ahead of piston 26 through duct 46 and into cylinder 12. Therefore, it will be seen, that the entire liquid in the device is uniformly compressed providing initially a mild spring rate. However, when the floating piston or valve 26 strikes stop 40, no further compression of liquid in bore 35, duct 46 and cylinder 12 can occur, because the pressurized liquid in cylinder 11 cannot get past the seals on piston or valve 26. Therefore, from this point on, additional liquid compression may only occur in cylinder 11, between seals 20 and 30. Since the body of liquid in cylinder 11 is relatively small and the entire force applied to piston 14 is now acting against this small body of liquid, the spring force developed within the spring will rise sharply as shown in the diagram in Fig. 4. By adjusting the stop 40, the point at which the spring rate increases can be predetermined.

When the force applied to piston rod 14 is removed, the liquid L expands back to its original volume. The pressurized liquid in cylinder 12, duct 46 and bore 35 acts against the seal 31 and forces piston 26 back to its original, starting position. Likewise, piston 20 is returned to its starting position by the expansion of liquid in cylinder 11.

With the liquid spring device just described, a low spring rate or cushioning force is initially developed; and, then a high spring rate or powerful cushioning force results. Such a device has wide application.

While the invention has been described in connection with one embodiment thereof, it will be understood that it is capable of further modification, and this application is intended to cover any variations, uses or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. A liquid spring comprising a container having a pair of compression chambers, a passage connecting said chambers, one of said chambers being closed except for said passage, a compressible liquid filling said chambers and said passage, means for compressing the liquid in the other of said chambers, means movable in said passage for transmitting the pressure applied to the liquid in said other chamber to the liquid in said one chamber, and means operable after a predetermined time after compression of said liquid for preventing further transmission of the pressure to the liquid in said one chamber, said means for compressing the liquid being operable thereafter to compress the liquid in said other chamber only, whereby a relatively small cushioning force is exerted initially by the total volume of liquid in the two chambers and thereafter a relatively high cushioning force is exerted by the volume of liquid in said one chamber, and means for adjusting the point at which said high cushioning force becomes effective.

2. A liquid spring comprising a container having a pair of chambers therein with an interconnecting passageway, one of said chambers being closed except for said passageway, a compressible liquid filling said chambers, a first piston reciprocable in the other of said chambers upon application of an outside force thereto, a single, second piston having liquid-tight engagement with said passageway to separate said chambers from one another, said second piston being movable in said passageway in one direction by liquid pressure upon movement of said first piston in said one direction to transmit said force to said one chamber to compress the liquid in said one chamber, and means operable at a predetermined point in the stroke of said first piston in said one direction to stop the movement of said second piston so that said first piston thereafter compresses only the liquid in said other chamber on continued movement of said first piston in said one direction.

3. A liquid spring comprising a container having a pair of chambers therein with an interconnecting passageway, one of said chambers being closed except for said passageway, a compressible liquid filling said chambers, a first piston reciprocable in the other of said chambers upon application of an outside force thereto, a single, second piston having liquid-tight engagement with said passageway to separate said chambers from one another, said second piston being movable in said passageway in one direction by liquid pressure upon movement of said first piston in said one direction to transmit said force to said one chamber to compress the liquid in said one chamber, and means operable at a predetermined point in the stroke of said first piston in said one direction to stop the movement of said second piston so that said first piston thereafter compresses only the liquid in said other chamber on continued movement of said first piston in said one direction, said stop means being adjustable to determine the point at which pressure is applied to said other chamber only.

4. A liquid spring comprising a container having a pair of chambers therein with an interconnecting passageway connecting the end of one of said chambers with the other chamber, one of said chambers being closed except at its point of connection to said passageway, a compressible liquid filling said chambers, a first piston reciprocable in the opposite end of said other chamber, a second piston reciprocable in liquid-tight engagement with said passageway and movable in said passageway in one direction upon movement of said first piston in said one direction to transmit said force to said one chamber to compress the liquid in said one chamber, and means operable at a predetermined point in the stroke of said first piston in said one direction to stop the movement of said second piston so that said first piston thereafter compresses only the liquid in said other chamber on continued movement of said first piston in said one direction, said stop means being adjustable to determine the point at which pressure is applied to said other chamber only.

5. A liquid spring comprising a container having a pair of chambers therein with an interconnecting passageway connecting one of said chambers with the other chamber, one of said chambers being closed except at the point of its connection with said passageway, a compressible liquid filling each of said chambers, movable means for applying a force to the liquid in the other chamber, separately movable means operable by the liquid in said other chamber to transmit said force to the liquid in said one chamber, and means operable after a predetermined movement of said separately movable means for stopping said transmitting means so that thereafter said force is applied to the liquid in said other chamber only, and means for adjusting the point at which said transmitting means is stopped.

6. A liquid spring comprising a container having a pair of chambers therein with an interconnecting passageway, a compressible liquid filling each of said chambers, one of said chambers being closed except at the point of its connection to said passageway, a piston reciprocable in said passageway in liquid tight engagement therewith and adapted to be moved in one direction in said passageway upon application of pressure to the liquid in the other of said chambers to apply pressure to the liquid in said one chamber, and means for applying pressure to the liquid in said other chamber, means for stopping movement of said piston in said one direction, so that upon continued application of pressure to the liquid in said other chamber only the liquid in said other chamber will be compressed, and means for adjusting the point at which movement of said piston in said one direction is stopped.

7. A liquid spring comprising a container having a pair of chambers therein with an interconnecting passageway, a compressible liquid filling each of said chambers and said passageway, one of said chambers being closed except at the point of its connection with said passageway, a piston reciprocable in said passageway in liquid tight engagement therewith and adapted to be moved in one direction in said passageway upon application of pressure to the liquid in the other of said chambers to apply pressure to the liquid in said one chamber, and means for applying pressure to the liquid in said other chamber, and means for stopping movement of said piston in said one direction, so that upon continued application of pressure to the liquid in said other chamber only the liquid in said other chamber will be compressed, and means for adjusting the point at which said piston is stopped, said stopping means engaging one end of said piston.

8. A liquid spring comprising a container having a pair of chambers therein and a passageway connecting one end of one of said chambers with the other chamber, a portion of said passageway, at least, extending at right angles to said one chamber, a compressible liquid filling each of said chambers and said passageway, said other chamber being closed except at the point of its connection to said passageway, a first piston reciprocable in said passageway in liquid-tight engagement therewith to transmit pressure of the liquid in said one chamber to the liquid in said other chamber, a second piston reciprocable in the other end of said one chamber to apply pressure to the liquid in said one chamber, and a stop engageable with one end of said first piston to limit movement of said first piston in one direction so that thereafter upon continued movement of said second piston in said one direction only the liquid in said one chamber will be compressed.

9. A liquid spring comprising a container having a pair of chambers therein and a passageway connecting one end of one of said chambers with the other chamber, a portion of said passageway, at least, extending at right angles to said one chamber, a compressible liquid filling each of said chambers and said passageway, one of said chambers being closed except at the point of its connection to said passageway, a first piston reciprocable in said passageway in liquid-tight engagement therewith to transmit pressure of the liquid in said one chamber to the liquid in said other chamber, a second piston reciprocable in the other end of said one chamber to apply pressure to the liquid in said one chamber, and a stop engageable with one end of said first piston to limit movement of said first piston in one direction in said passageway so that thereafter upon continued movement of said second piston in said one direction only the liquid in said one chamber will be compressed, said stop comprising a rotary member rotatable about an axis perpendicular to the axis of said one cylinder and having a stopping portion eccentric of the first-named axis, and means journaled in said container for rotating said stop.

10. A liquid spring comprising a container having two separate chambers therein and a passage connecting said chambers, a valve member reciprocable in said passage, said chambers and passage being filled with a compressible liquid, a piston reciprocable in one of said chambers and movable inwardly of said one chamber upon application of an outside force to said piston to apply pressure to the liquid in said one chamber, the other chamber being closed except at the point of its connection to said passage, said valve member being movable in one direction in said passage by pressure on said valve member of the liquid in said one chamber, a seat in said passage for limiting the movement of said valve member in said one direction of its movement, thereby to close off the liquid in said other chamber from transmission of compressive force thereto, whereby continued movement of said piston in the first-named direction will compress the liquid in said one chamber only, said piston being movable in the opposite direction upon relief of said outside force, and said valve member being movable in the opposite direction of its movement upon movement of said piston in said opposite direction whereby the liquid in both said chambers can expand.

11. A liquid spring as claimed in claim 10 having means for adjusting the position of said seat, thereby to adjust the limit of movement of said valve member in said one direction of its movement.

12. A liquid spring comprising a container having two separate chambers therein, compressible liquid in said chambers, means for applying an outside force to the liquid in one of said chambers, movable means operable by the pressure of liquid in said one chamber for transmitting said force to the liquid in the other chamber, said other chamber being closed off from communication with said one chamber and being otherwise closed, means operable after predetermined movement of said movable means in one direction to stop movement of said movable means and thereby stop transmission of said force to the liquid in said other chamber, the liquid in said one chamber expanding upon relief of said outside force, thereby to permit expansion of the liquid in said other chamber and permit the liquid in said other chamber to move said movable means in the opposite direction.

References Cited in the file of this patent

UNITED STATES PATENTS

| 1,847,491 | Messier | Mar. 1, 1932 |
| 2,554,807 | Bingham | May 29, 1951 |
| 2,648,949 | Taylor | Aug. 18, 1953 |